United States Patent [19]
Manfredini

[11] Patent Number: 6,145,988
[45] Date of Patent: Nov. 14, 2000

[54] METHOD FOR CONTACT LENS DESIGN AND MANUFACTURING

[75] Inventor: Maurizio Manfredini, Florence, Italy

[73] Assignee: EIKON di Chavacci Daniela & C.S.a.s., Florence, Italy

[21] Appl. No.: 09/048,942

[22] Filed: Mar. 26, 1998

[30] Foreign Application Priority Data

Mar. 26, 1997 [IT] Italy .................................. FI97A0058

[51] Int. Cl.⁷ ...................................................... G02C 7/04
[52] U.S. Cl. .................. 351/177; 351/160 R; 351/160 H
[58] Field of Search ........................... 351/160 R, 160 H, 351/161, 162, 177

[56] References Cited

U.S. PATENT DOCUMENTS 5,452,031   9/1995   Ducharme ................................ 351/177

OTHER PUBLICATIONS

Rowsey, J. James, and Schanzlin David J. Corneal Topography. Contact Lenses, the CLAO Guide to Basic Science and Clinical Practice. Contact Lens Association of Ophthalmologists, Grune & Stratton, Orlando, Florida, 1986, Chapter 4.

*Primary Examiner*—Scott J. Sugarman
*Attorney, Agent, or Firm*—Simpson, Simpson & Snyder, L.L.P.

[57] ABSTRACT

A contact lens manufacturing method by electronic matching the corneal shape. The corneal shape is reproduced in the back surface of a contact lens via electronic corneal topography, according to morphological conditions imposed by functional optimization of said lens and a numerical definition of a tear film layer covering the cornea surface. The invention provides electronic corneal topography and numerical optimization techniques to define the lens geometry in order to achieve a corneal fit congruent with the fitter choice. The contact lens specialist who examines the cornea may configure the numerical processing according to the kind of corneal fit he chooses, without having to define lens geometrical parameters. The method provides a numerical description of the lens geometry, that is translated into a suitable format for Computer Numerical Controlled (CNC) machining.

10 Claims, 3 Drawing Sheets

METHOD FOR CONTACT LENS DESIGN AND MANUFACTURING

TECHNICAL FIELD

The present invention relates to a method for designing and manufacturing contact lenses which match the cornea in an optimal way.

BACKGROUND

The geometry of the contact lens surface that rests on the cornea, also called back or concave lens surface and opposite to the front or convex surface, is normally identified by predefined geometrical parameters.

Contact lenses can be grouped in two classes, depending on the shape of the back surface which matches the cornea: spherical and aspherical.

Spherical geometry is obtained from combined spherical surfaces centered on the symmetry axis of the lens. Such surfaces are identified by the radius of the corresponding sphere and their radial extension about the symmetry axis of the lens.

The use of corneal topography in contact lens fitting has been suggested applied to spherical geometry to evaluate the base curve radius of a contact lens. See for references Chapter 4 of "Contact Lenses, the CLAO Guide to Basic Science and Clinical Practice", by the Contact Lens Association of Ophthalmologists, Grune & Stratton, Orlando, Fla., 1984.

Lenses having more complex rotation surfaces, such as having a conic curve profile, polynomial or other, are generically called aspherical. Toric or other shapes without rotational symmetry are built as variants of the previous ones.

Spherical lenses are often uncomfortable, and their geometry often has a too low number of degrees of freedom to match the large variability of corneal morphology.

Aspherical geometry has been introduced in the contact lens field when technology allowed their manufacturing with sufficient accuracy, with the aim of matching more varieties of corneal topologies.

On the other hand, the high number of degrees of freedom of the aspherical lenses in an inconvenience for the contact lens specialist who has to consider many parameters (e.g. polynomial coefficients) and cannot obtain the final lens shape without several fitting tries that may require several lens manufactured, loss of time, higher costs and unease for the patient and the fitter.

In the case of sclera support lenses molding resin or rubber are used to reproduce corneal and scleral shape. This technique is somewhat invasive, due to the physical contact between resin and the eye, and has got known physiological and pharmacological drawbacks.

Known prior studies suggest for example the use of spline curves for approximating a set of corneal measurements, but they are limited to the lens profile and do not consider creation of non-rotation-symmetric geometry. Other studies for asymmetrical geometry design are based on splitting the surface into a number of radially extending segments each approximating the corneal surface. However, even if each segment has a good approximation of the surface, u further effort which is continuous and has continuous first derivatives.

OBJECTS OF THE INVENTION

It is an object of the present invention to provide a method for designing and manufacturing contact lenses having a customized geometry fitting the patient's eye and that does not require the traditional trial and error technique.

It is another object of the present invention to provide a method for designing and manufacturing contact lenses having a highly repeatable lens geometry as numerically defined, as well as design and calculation efficiency.

It is also an object of the present invention to provide a method for designing and manufacturing contact lenses which are optimized for their tear film flow and dynamic adaptation to the eye.

It is a further object of the present invention to provide a method for designing and manufacturing contact lenses which require an adaptation time shorter than usual and are more comfortable because of the capability of matching a large eye's area and of the absence of rough edges.

BRIEF DESCRIPTION OF THE INVENTION

According to the present invention the corneal morphology is acquired via electronic topography, that typically uses optical reflection, and is therefore negligibly invasive. Then, the contact lens is designed as matching an electronic corneal topography and modified according to the desired kind of optimal fit. The contact lens designed with this method can be industrially manufactured with a CNC machine tool (e.g. lathe) by a workshop cooperating with the fitter's office.

DETAILED DESCRIPTION OF THE INVENTION

According to the invention, starting from the data stored in an electronic numerical topography, a numerical optimization of an aspherical lens geometry that fits the corneal shape according the optimal criterion chosen by the fitter is carried out. Such criterion takes into account the desired optimal shape of the tear film layer between lens and cornea and is expressed as a condition of optimal congruence of the desired tear film layer shape to the actual one.

As an example, if the fitter desires that the lens surface is supported uniformly over most of the eye surface, but that it raises at the periphery, the desired tear film shape has very little or zero thickness in the central support zone, gradually increasing towards periphery.

Of course, corneal topography must be detailed enough. This is now possible, since topographic apparatus are available producing digital maps having more than 5000 points distributed over at least 90% of the corneal surface. The machining accuracy must be sufficient as well. CNC lathes are known whose cutting precision is of the order of tens of nanometers, that is more than enough to make very good lenses.

In order to be functionally efficient, the back surface of the lens must satisfy some more requirements than the morphological corneal fit. This method provides that such surface and first order derivatives thereof are continuous in each point to avoid that sharp edges compromise lens comfort, or corneal damage.

The lens back surface is also an optical refractive surface, so it must have good optical properties in the central portion thus positively affecting vision efficiency. It is worth pointing out that some aberration phenomena may be corrected by a suitable front surface geometry.

One more feature of the invention is that the morphological matching between cornea and back lens surface is optimized with respect to the lens position on the cornea, and not only to the lens shape. This is important because digital topographers typically do not give information relative to reference corneal points such as corneal apex, symmetry axis, keratoconus apex, that are cited in contact lens literature.

The described invention defines a condition of best match between lens and cornea that can be optimized with respect to lens position as well as to the lens shape. Such a condition is also a condition of maximal dynamic stability of the lens; in fact it contact lens dynamics depend on two opposing causes:

destabilizing actions of eyelashes, eye motion and lens weight.

stabilizing action of molecular cohesion forces due to tear fluid. Such action gets stronger as the mean thickness of the tear layer gets thinner.

The condition of best morphological match between lens and cornea is therefore strictly related with dynamical stability of the lens itself, that is usually a desirable feature for rigid contact lenses for comfort and vision quality. When the contact lens specialist modifies the tear layer shape, he can act also on the lens dynamics; contact lens theory tells that uniform or peripherally supported lenses are less moveable than centrally supported ones.

One more feature of the invention concerns the capability to design a rotation symmetric lens suitable for fitting a slightly astigmatic (or more generally asynmmetric) cornea, with obvious advantages in terms of manufacturing ease. In standard contact lens techniques this is achieved fitting a lens whose curvature is intermediate between the corneal extreme ones, and closer to the flattest than to the steepest. In this invention the back lens surface geometry is obtained by weighted approximation of the corneal shape. The contact lens specialist can act on a weight coefficient or function to make the resulting approximation surface closer to the flattest corneal profile.

It can be further observed that a non-weighted rotation symmetric approximation of an astigmatic corneal shape generates a surface that is suitable for toric modification by cutting, since its profile is qualitatively a mean value between the extreme corneal curvatures. Such toric cutting can be achieved by crimping, or oscillating tool machine. In particular the crimping technique is the less expensive for toric cutting.

As an alternative an axial non-rotation symmetric surface, e.g. toric, can be designed and built by analogous numerical approximation of the corneal shape. Furthermore a non-axial-symmetric surface can be designed compatibly with realization, for best corneal fit even in the case of very bad shaped ones.

It is worth to point out that a non-axial-symmetric lens design is not possible without a wide spread information of the corneal shape, and is extremely hard to work out without an automated method as this is.

CNC machine tools for contact lens production are most commonly lathes, because of their better machining quality with respect to other systems. Lathes are also known that allow non-axial-symmetric machining by synchronized oscillation of the cutting tool.

The present method provides a geometrical lens description that may be recorded on nonvolatile computerized support. The numerical description of the lens guarantees a high repeatability level.

This invention substantially differs from computer aided lens design techniques that require the definition by a human fitter of the lens geometry and a simulation of its behavior on the eye. In this invention the lens geometry is a result of an automated optimization method configurable by the fitter.

BRIEF DESCRIPTION OF THE DRAWINGS

Further characteristics and advantages of the method according to the present invention will become more apparent in the description which follows of one of its embodiments, given as an example and not limitative, with reference to the attached drawings in which:

In FIGS. 3 and 4 the tear layer thickness modulation is obviously exaggerated for drawing convenience. In FIGS. 2, 3 and 4 the cross section representation ignores an angular coordinate that will be indicated as f where required.

DESCRIPTION OF THE PREFERRED EMBODIMENT

In order to show a preferred realization of the invention, a procedure for the generation of a suitable corneal topography approximating surface is described. Various mathematical instruments can be used for this purpose, and may differ from that described here even if they remain within the field of this invention.

Figure 2:
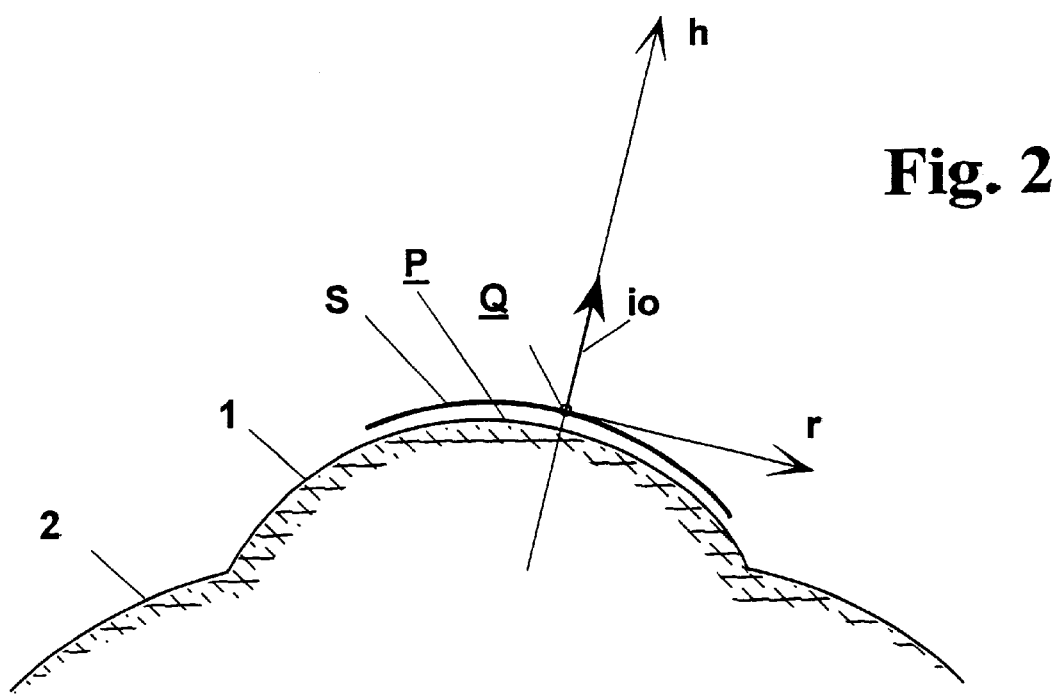
FIG. 2 represents a cross section of the corneal surface with an associated approximating surface S whose position is identified by a unit size vector i0 and a point Q, wherein h and r represent the axial and radial coordinates of the surface respectively, with respect to the lens axis identified by Q and i0; in particular h indicates the distance from Q and the orthogonal projection of a surface point on the axis, r indicates the distance of said surface point to said axis. The S surface is shown distinct from the corneal one for graphical convenience.

With reference to FIG. 2, given a topography of a cornea 1 surrounded by a sclera 2, an approximating surface S is considered having rotational symmetry with respect to an axis identified by a direction i0 and a point Q. The profile of said surface is described by a finite number of coaxial adjacent conical arcs, the first of which has origin in Q, and the last reaches the edge of S, whose diameter is the same as the lens one.

In the topographical three dimensional reference the position of S is identified by 5 independent variables: the components of vector Q and two parameters of direction i0. The shape of S is identified by apical radius and eccentricity of each conic relative to each arc.

Figure 5:
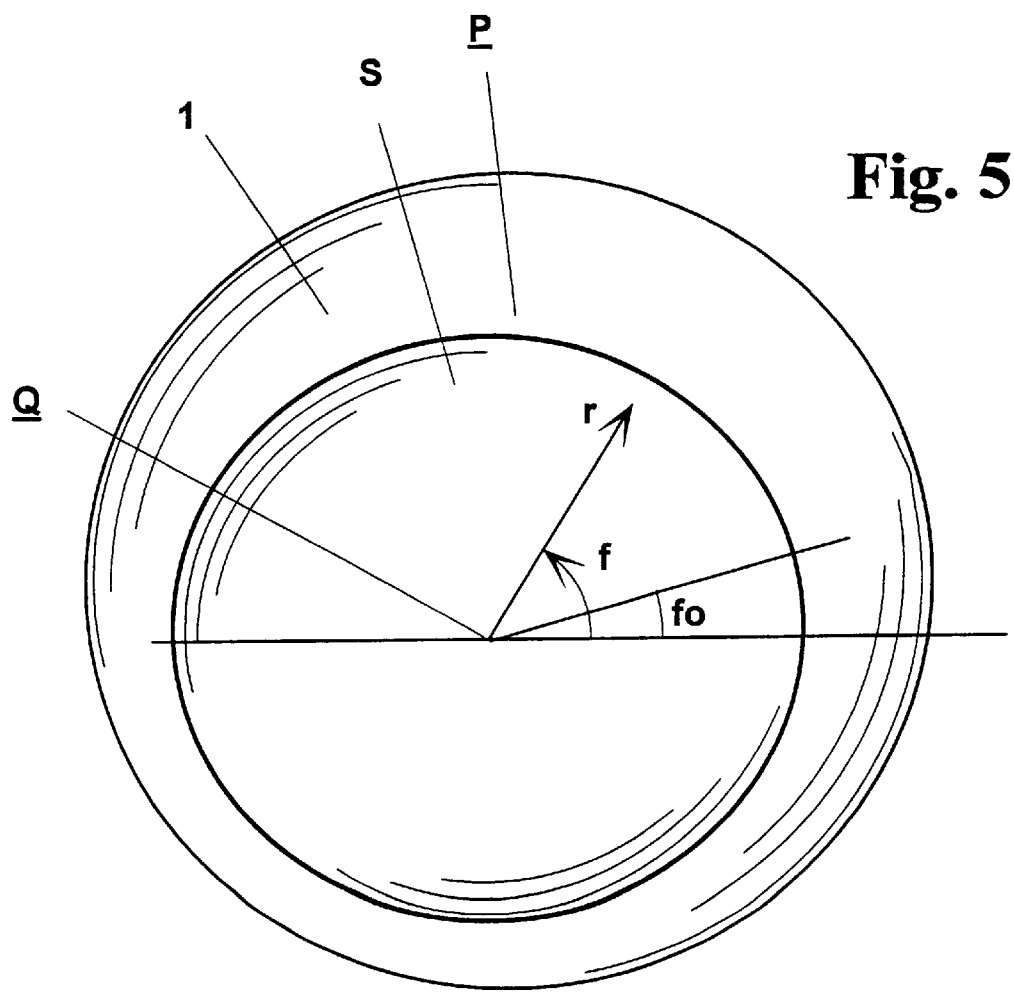
FIG. 5 is a front view of the contact lens of FIG. 4, where f is an angular coordinate.

A more complex description, satisfying the condition of non-rotational axial symmetry, may be considered adding to the described profile a function of the radial and angular coordinates r,f such as: $g(r,f)=a*r^2*\sin(2*f-f0)$. Such function is identified by the parameters a and f0 in a suitable angular reference, as shown in FIG. 5, and is half circle periodical, and so suitable for representing an axial symmetric surface. A non-axial-symmetric surface may be designed considering a more complex dependence on the angular coordinate, as a parameterization in terms of Fourier coefficients: g(r,f)=r$^2$*sum(ai*cos(f*i)+bi*sin(f*i)) being the sum extended to finite terms.

The conditions to which the surface must comply are as indicated in the general description:

surface continuity were arcs join;

first order differentiability where arcs join.

The optical quality of the central portion of the surface is guaranteed being a conical surface.

All of these conditions can be expressed by non-linear relations on the parameters of S.

Surface parameters and surface position are calculated by a non-linear numerical optimization method that minimizes a functional V related to congruence between a topographic map and the approximating surface and defined by the following integral:

$$V=\int\int([P-Q]*i0-h(r,f)]^2)*\beta(r,f)dS$$

where P is the vector position of a corneal topography point, and h(r,f) is the axial coordinate of S; such integral is extended to the lens boundary. The [P-Q)*i0-h(r,f)]$^2$ factor costs the distance between lens surface and topography; the β(r,f) factor is a weight function on the approximation error such that:

$$\beta(r,f)=1 \text{ if } [P-Q]*i0-h(r,f)]<=0,$$

$$\beta(r,f)=K \text{ if } [P-Q]*i0-h(r,f)]>0, \text{ being K a positive parameter user definable.}$$

The K parameter is meant to differentiate the effect of the approximation error depending on its sign; for example, if the topography is that of an astigmatic cornea, a rotation symmetric approximation produces a surface whose curvature is intermediate between the two corneal extremes; when K=1 the resulting approximation obeys the minimum square error rule; when K>1 the result is closer to the flattest corneal profile.

Therefore, it is possible to design a rotation-symmetric lens for a moderately astigmatic cornea, by means of a single, shape independent weight coefficient.

Minimizing such V functional is possible by a standard nonlinear optimization algorithm, and produces not only the shape of S but also the position in which the approximation is most congruent in the sense described above.

In any case, whenever the resulting position is not satisfying, the user can be left the ability of choosing the position where to calculate the matching geometry. Choosing the number and the extension of the conical arcs the user may control the resulting compromise between surface smoothness and approximation accuracy.

Figure 3:
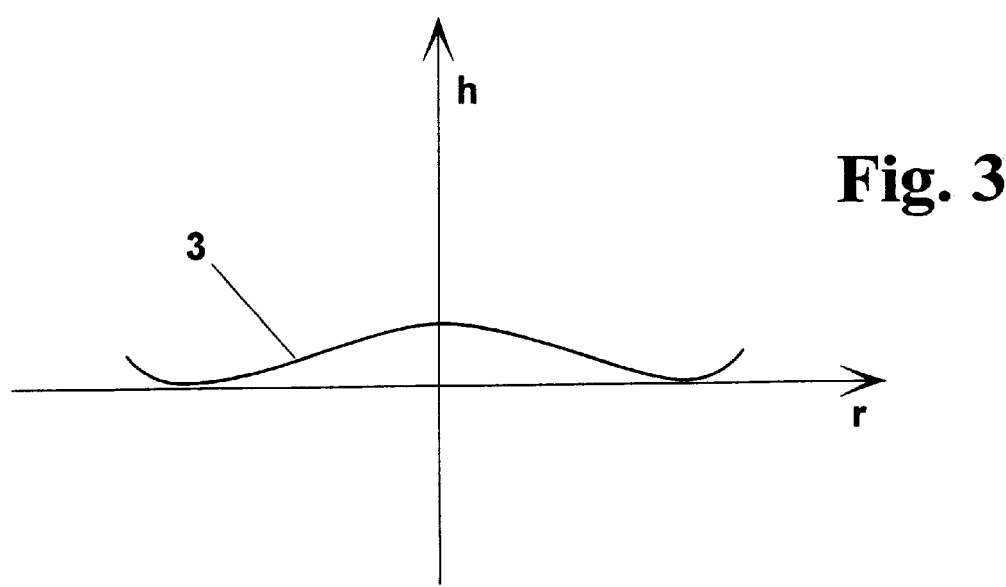
FIG. 3 represents a section of the desired tear layer thickness, wherein h and r coordinates are referred to the lens axis and precisely h indicates the tear layer thickness at a distance r from the axis.
Figure 4:
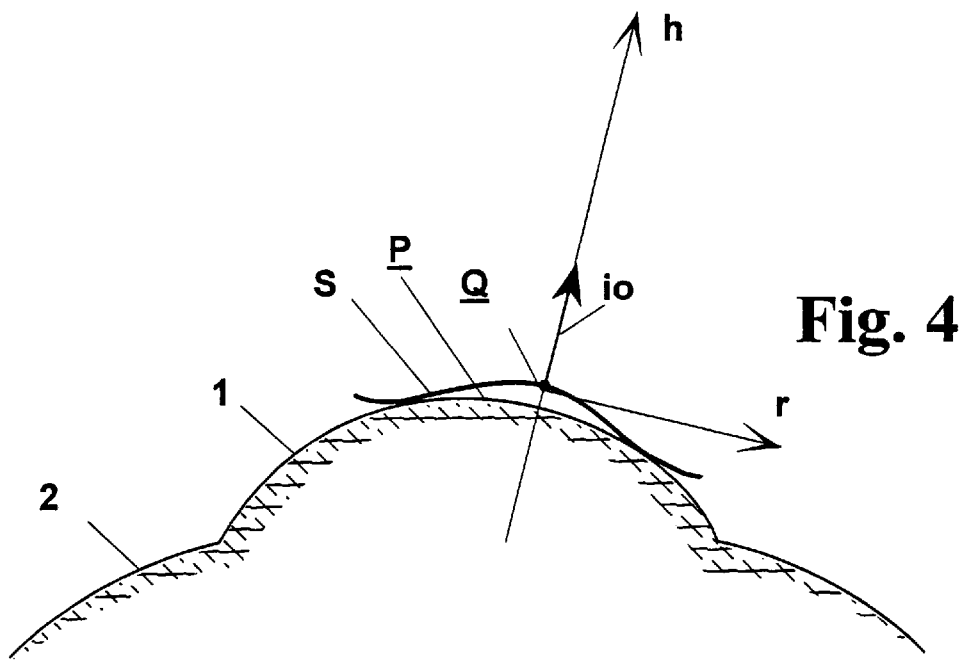
FIG. 4 represents a section of the corneal surface with an associated lens surface L resulting from the surface S modified according to the desired tear layer. The i0 axis, Q point, r and h coordinates references have analogous meaning to what explained for FIG. 2.

The approximating surface S is modified according to the desired tear layer shape 3 (an example of which is given in FIG. 3) adding to the axial coordinated of its points the tear thickness in said points, thus obtaining the lens surface shown in FIGS. 4 and 5. The desired tear layer shape 3 may be considered a modification to the approximating surface as it typically satisfies smoothness properties analogous to those requested to the lens surface.

The obtained surface constitutes the lens back side.

Figure 1:
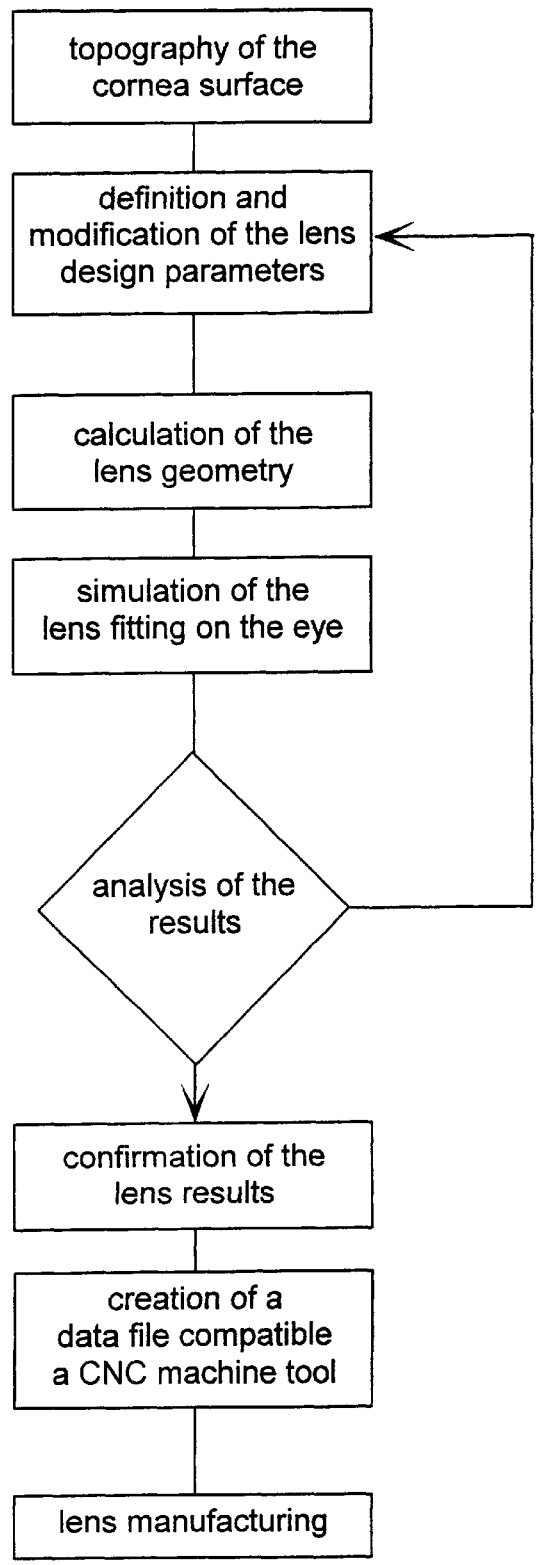
FIG. 1 is a flow chart describing the design and production method according to the invention.

In a preferred embodiment of the invention, and with reference to FIG. 1, the complete lens design and manufacturing method provides the following steps:

a) Digital corneal topography acquisition by the contact lens specialist;

b) main fitting parameters definition and input on the computer that calculates the geometry; in the present embodiment such parameters are:

total lens diameter;

number and extension of the ring zones that divide the back lens surface;

K weight coefficient for the V functional;

desired tear layer shape;

furthermore:

central or junction and edge thickness of the lens;

edge shape;

refractive information;

c) lens back surface geometry calculation, front surface calculation according to refractive data and thickness, generation of the edge profile; all of these operations are performed by a programmed computer;

d) results visualization, and simulation of the lens behavior on the eye; this operation is performed by standard computer presentation devices' e) filter evaluation of the results and simulation;

f) possible modification of the parameters of step b;

g) non-volatile recording of the obtained geometry to allow reproduction, analysis or modification;

h) computer numerically controlled (CNC) machine programming for lens manufacturing; typically it is a job file of suitable format; such information and/or that of step g is transferred from the fitter office to the production workshop by means of standard electronic communication;

i) lens production by a specialized workshop; such workshop may be distinct from the fitter office, but electronically connected to it; it must be equipped with a CNC machine for lens cutting.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

What is claimed is:

1. A method for designing and manufacturing contact lens with aspherical geometry, said lens having a front surface, an edge and a back surface suitable for matching an eye's cornea surface by interposition of a tear film layer, comprising the steps of:

conducting digital topography of said cornea surface and creating a numerical definition of said cornea surface;

choosing a surface portion approximating said cornea surface as defined by said numerical definition of said cornea;

determining a numerical definition of a tear film layer covering said cornea surface;

choosing a lens back surface approximating the summation of said surface portion and said tear film layer as defined by said numerical definitions;

designing the front surface shape and edge shape; and cutting the lens by a CNC machine tool, wherein the step of choosing a surface portion approximating said cornea surface as defined by said numerical definition of said cornea further comprises the steps of:

defining as approximating surface a function having rotational symmetry with respect to an axis starting from an origin, adding to said approximating surface a function of non-rotational axial symmetry.

2. Contact lens manufacturing method according to claim 1, wherein said approximating surface function having rotational symmetry is formed by a finite number of coaxial adjacent conical arcs, a first arc thereof starting from said origin and a last arc ending at said edge, a further step of defining an apical radius and an eccentricity of each arc being provided, said approximating surface being further characterized by:

surface continuity where said arcs join;

continuity of the first order derivatives where said arcs join.

3. Contact lens manufacturing method according to claim 1, wherein said function of non-rotational axial symmetry has the formula $$g(r,f)=a(r)*r^2*\sin(2*f-f0)$$

wherein r,f are the radial and angular coordinates of said surface and f0 is a angular reference half circle periodical.

4. Contact lens manufacturing method according to claim 2 wherein said function of non-rotational axial symmetry has the formula $$g(r,f)=a(r)*r^2*\sin(2*f-f0)$$

wherein r,f are the radial and angular coordinates of said surface and f0 is a angular reference half circle periodical.

5. Contact lens manufacturing method according to claim 1, wherein said approximating surface having rotational symmetry is formed by a finite number of adjacent arcs, a first arc thereof starting from said origin and a last arc ending at said edge, and said function of non-rotational axial symmetry is a sum function extended to finite terms:

$$g(r,f)=r^2*\text{sum}(ai(r)*\cos(f*i)+bi(r)*\sin(f*i)),$$

r,f being radial and angular coordinates of said surface and i an index.

6. Contact lens manufacturing method according to claim 2, wherein said function of non-rotational axial symmetry is a sum function extended to finite terms:

$$g(r,f)=r^2*\text{sum}(ai(r)*\cos(f*i)+bi(r)*\sin(f*i)),$$

r,f being radial and angular coordinates of said surface and i an index.

7. Contact lens manufacturing method according to claim 1, wherein said lens back surface and its position are calculated by a non-linear optimization which minimizes a functional V related to congruence between said corneal topography and said approximating surface, said congruence being defined by the following integral:

$$V=\int\int([(P-Q)*i0-h(r,f)]^2)*\beta(r,f)dS$$

wherein P is a vector position of a corneal topography point and h(r,f) is the axial coordinate of the surface S, Q is a vector of said origin, $[(P-Q)*i0-h(r,f)]^2$ is the distance between said lens surface and said topography; $\beta(r,f)$ is a weight function on the approximation error.

8. Contact lens manufacturing method according to claim 7, wherein $\beta(r,f)$ is defined by:

$$\beta(r,f)=1 \text{ if } [(P-Q)*i0-h(r,f)]<=0;$$

or $$\beta(r,f)=K \text{ if } [(P-Q)*i0-h(r,f)]>0,$$

where K is a positive number.

9. Method for designing and manufacturing contact lens with aspherical geometry, said lens having a front surface, an edge and a back surface suitable for matching an eye's cornea surface by interposition of a tear film layer, comprising the steps of:

conducting digital topography of said cornea surface and creating a numerical definition of said cornea surface;

choosing a surface portion approximating said cornea surface as defined by said numerical definition of said cornea;

determining a numerical definition of a tear film layer covering said cornea surface;

choosing a lens back surface approximating the summation of said surface portion and said tear film layer as defined by said numerical definitions;

designing the front surface shape and edge shape; and cutting the lens by a CNC machine tool, wherein said lens back surface and its position are calculated by a non-linear optimization which minimizes a functional V related to congruence between said corneal topography and said approximating surface, said congruence being defined by the following integral:

$$V=\int\int([(P-Q)*i0-h(r,f)]^2)*\beta(r,f)dS$$

wherein P is a vector position of a corneal topography point and h(r,f) is the axial coordinate of the surface S, Q is a vector of said origin, $[(P-Q)*i0-h(r,f)]^2$ is the distance between said lens surface and said topography; $\beta(r,f)$ is a weight function on the approximation error.

10. Contact lens manufacturing method according to claim 9, wherein $\beta(r,f)$ is defined by:

$$\beta(r,f)=1 \text{ if } [(P-Q)*i0-h(r,f)]<=0;$$

or $$\beta(r,f)=K \text{ if } [(P-Q)*i0-h(r,f)]>0,$$

where K is a positive number.

* * * * *